United States Patent [19]

Weissler

[11] 4,174,884
[45] Nov. 20, 1979

[54] OPTICAL VIEWER WITH ADJUSTABLE ANGULAR CONVERGENCE

[76] Inventor: Alain Weissler, "Les Muriers", 91800, Boussy, St. Antoine, France,

[21] Appl. No.: 807,038

[22] Filed: Jun. 16, 1977

[30] Foreign Application Priority Data

Jun. 29, 1976 [FR] France .............................. 76 19760

[51] Int. Cl.² ............................................ G02B 27/22
[52] U.S. Cl. ................................. 350/138; 350/139; 350/145
[58] Field of Search .............. 350/133, 137, 138, 139, 350/145, 170, 173

[56] References Cited

FOREIGN PATENT DOCUMENTS 432385 3/1948 Italy ........................................ 350/137
908319 10/1962 United Kingdom ..................... 350/145

Primary Examiner—John K. Corbin
Assistant Examiner—Scott J. Sugarman

[57] ABSTRACT

The invention relates to viewers intended for the observation of visual pictures.

In order to cause the angular convergence of visual radii to vary, at the level of an observer's eyes (G) and (D), when viewing pictures (1) and (1'), two pairs of prisms (2) and (2'), (3) and (3') are interposed on the optical paths, the first pair being in part reflective and transparent, thus creating a common beam (7) (7'), where a single converging lens (8) makes it possible, by displacement of its optical center (C), along the directions (17), to vary the angular observation convergence.

Applications consist, in particular, in examining stereoscopic images.

6 Claims, 4 Drawing Figures

OPTICAL VIEWER WITH ADJUSTABLE ANGULAR CONVERGENCE

The present invention relates to the field of optical apparatus which make possible the binocular observation of actual pictures, in particular, in the form of photographic stereoscopic couples, which are observed either by transparency, or in reflected light on paper prints. In both cases, it is known that such image (picture) couples are generally obtained by means of photographic apparatus having two objectives and two separate "black chambers" (cameras obscurae), the distance between the optical axes of the two objectives being of the order of magnitude of the distance between the eyes of an average size human being.

In order to obtain a good sensing of the stereoscopic relief (third-dimensional appearance) provided by binocular observation of such couples, optical apparatus have been proposed which, for the sake of simplification, shall hereinafter be referred to as viewers and which provide simultaneously optimum adjustment of three basic characteristics of viewing, namely, on the one hand, the coincidence of the optical axes of the eyes of the observer and of the observation eyepieces, on the other hand, the observation, or "fine setting" distance, which is tied to the convergence or "power" of the oculars (eyepieces) for an examination of the images without visual accommodation fatigue, and finally, the angular convergence of the respective optical axes.

It has been recognized, in practice, that, for psychophysiological reasons, these three characteristics are bound to one another and react to a considerable extent on the degree of obtention of the stereoscopic perception.

It is certain that the variable distance (spacing) of the optical axes of the eyepieces, for example, will modify the angular convergence required by the observer's eyes, in the same way as a high angular convergence of the eyes, for example, will require an adjustment of the fine setting of the eyepieces which will correspond to close distance accommodation.

The viewers which have been suggested in order to satisfactorily obtain these three characteristics thus comprise three groups of mechanical devices the actual realization of which, if precision of adjustments is sought, leads to complicated, hence expensive structures.

For example, obtention of an adjustable angular convergence requires the use of prisms or mirrors that rotate about axes whose angles of rotation must be symmetrical; likewise, the adjustable fine setting distance requires simultaneous displacement of two eyepieces parallel to their optical axes, with the possibility, nevertheless, of causing the distance between these same axes to vary.

The viewer forming the subject of the present invention has none of these drawbacks.

In its principle, it requires merely fixed mirrors the putting in place of which is not very critical; the eyepieces that it uses do not comprise any refracting element of their own and, in addition, they are fixed (stationary) from a geometric point of view. The only moving part, whose displacement ensures the adjustable angular convergence of the axes of the observer's eyes, is a single converging lens for both eyes which moves simply, in accordance with a preferred embodiment, by rolling on its outer contour circumference.

More specifically, the present invention relates to a stereoscopic viewer with variable angular observation convergence.

Binocular optical viewer devices of the invention have adjustable angular convergence, for the visual observation of flat picture couples, and would utilize a housing, having a front face provided with two viewing openings, and a rear face for the reception of said pictures, the straight reference lines passing respectively through the picture centers and the centers of the viewing openings being parallel, and admitting in their midst a common perpendicular plane of symmetry.

In accordance with the invention, two pairs of mirrors are inserted on the optical paths included between said openings and said pictures, each pair, arranged dihedrally, being contained in a pair of planes arranged 90° from each other and being symmetrical with respect to the common plane of symmetry, their respective edges being parallel to the plane of said pictures, the mirrors of one of said pairs being partially transparent and reflective.

The invention will be better understood by means of the description which follows, in conjunction with the attached figures, in which:

FIG. 1 shows a first embodiment of a viewer in accordance with the invention, pursuant to a representation in which only the essential optical elements have been indicated.

Figure 1:
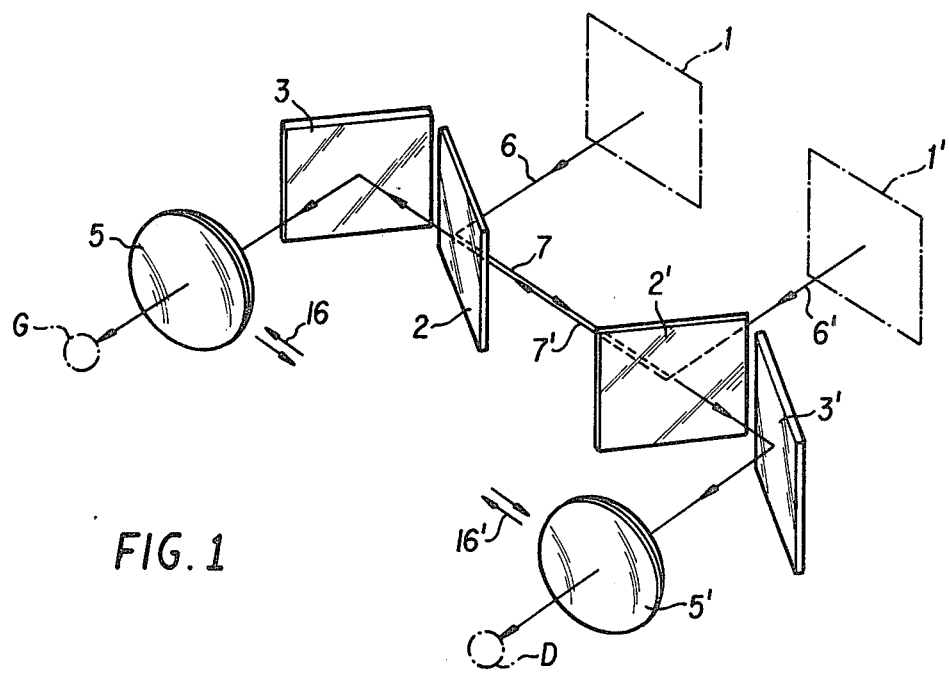
FIG. 1 shows a first embodiment of a viewer in accordance with the invention.

The two pictures 1 and 1' of the stereoscopic couple being arranged at a given distance from one another, in the present case much smaller than the normal distance that separates two human eyes represented at G and D, two mirrors 2 and 2' are arranged perceptibly opposite the images 1 and 1', their respective planes forming a 45° angle with that of the pictures and having in common an edge which is perpendicular to the direction joining the centers of the two pictures. The mirrors 2 and 2' are in part reflective and transparent; they thus reflect a portion of the incident luminous energy and allow the remaining portion to pass through them. By way of example, the power may consist of 50% reflected light and 50% transmitted light.

A second pair of mirrors 3 and 3' are arranged outside of the first pair 2 and 2', their respective planes also forming a 45° angle with that of the images and having in common an edge which is perpendicular to the direction joining the centers of the two images. These mirrors 3 and 3' are fully reflective. The 45° angle which they form with the plane of the pictures is counted symmetrically with respect to that which the mirrors 2 and 2' form, this resulting in the respective planes of the two pairs of mirrors 2 and 3, 2' and 3' forming a 90° angle between themselves.

Finally, two converging lenses 5 and 5' are arranged opposite the two mirrors 3 and 3'.

An optical device of this type operates as follows: the two eyes at locations G and D which are placed in front of the lenses 5 and 5' respectively representing the eyepieces (oculars) of the viewer, a ray of light such as 6, emanating from image 1, for example, will reflect itself partially on the mirror 2, go through the mirror 2' which is partially transparent and, after reflection on the mirror 3', end up at the eye through the lens 5'.

If the length of the total optical path is equal to the focal distance of the lens 5', the image 1 is thus observed at infinitum and consequently, without any eye accommodation being necessary. A similar path, with suitable like changes of the reference numbers in using elements 2', 2, 3, and 5 can obviously be obtained for image 1' and the eye G.

It should be noted that the distance of images 1 and 1' can be made freely determinable with respect to the imposed distance of eyes G and D, this constituting an important advantage. FIG. 1 represents the case in which the distance of the images is less, but, by virtue of the law of reverse return of light, the same apparatus, by switching the images and oculars, would ensure observation for a distance of the pictures greater than that of the eyes. The first case, however, is more advantageous for practical applications in which stereoscopic picture couples are obtained, in the taking of photographs, with apparatus providing images which are closer than the optical axes of human eyes.

However, the viewer of FIG. 1 has one important drawback, that of requiring, in order to cause the distance of the optical axes of the eyepieces to vary and thus to act on the angular convergence of the eyes the necessity for which was explained further above, a mechanism which acts simultaneously and in equal and opposite quantities on the position of the lenses 5 and 5' along the directions 16 and 16'. Such a type of mechanism is complicated and expensive.

Figure 2:
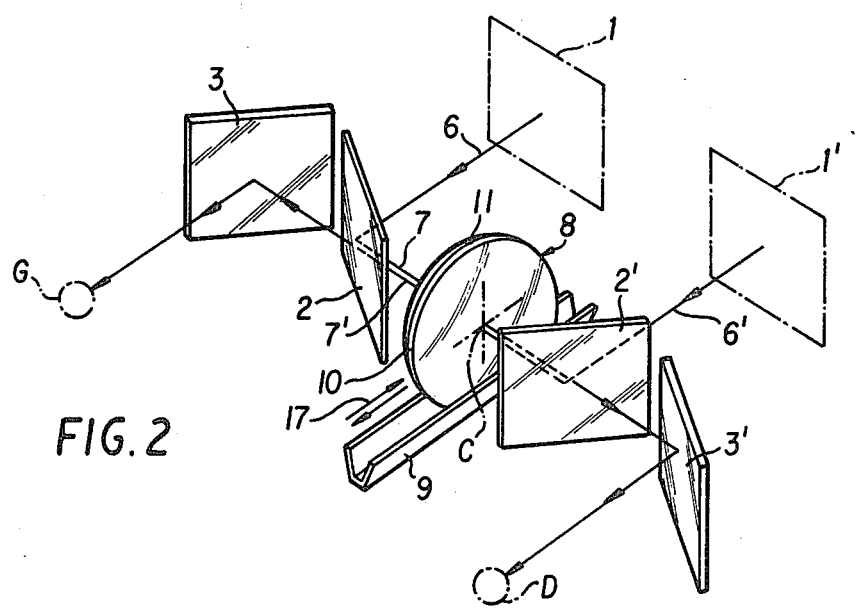
FIG. 2 shows a second embodiment, the preferred one.

FIG. 2 shows a preferred embodiment of the viewer in accordance with the invention. Pursuant to this embodiment, in which the same reference numbers represent the same members, the two lenses 5 and 5' of the eyepieces are replaced by a single lens 8, arranged in the plane of symmetry which is perpendicular to the straight line joining the centers of the images. This lens is thus traversed simultaneously by two beams of opposite directions 6 and 6' in their common portion 7 and 7'. In operation, a translation of this single lens 8 in its plane along the direction 17, will result in the same optical effects as those described in connection with FIG. 1. But the use of such a lens affords important advantages. First of all, it provides adjustment by geometric displacement of only one member. But, in addition, it does away with the need for any complicated mechanism, as it is possible to derive a particularly simple embodiment from the choice of a translation of the lens by rolling on its edge 10 in a guiding channel (groove) 9, its movement being controlled by direct manual action on the upper portion 11 of the lens.

Figure 3A:
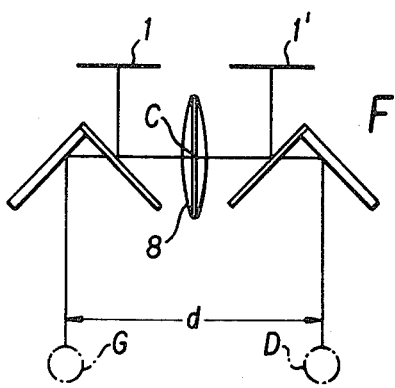
FIGS. 3a and 3b are each an explanatory diagram of this second embodiment.
Figure 3B:
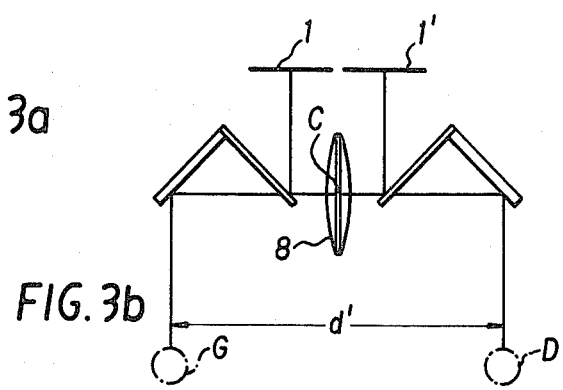

FIGS. 3a and 3b shows, in the form of two explanatory diagrams the two extreme cases corresponding to the final positions of the lens.

In FIG. 3a as shown by distance d, the optical axes are very close to one another; in FIG. 3b it is clear that by displacing the optical center of the lens 8, the resultant optical axes will be very far apart from one another as seen at d'.

It results from this that, from the psycho-physiological point of view of the vision, in which the two eyes concentrate respectively on the same corresponding details contained in the two stereoscopic images, everything will proceed as if the optical axes had, for observation purposes, a freely adjustable geometric convergence by merely moving a single convergent lens.

The viewer with variable geometric convergence for the observing of stereoscopic couples has been described above merely with respect to embodiments mentioned by way of example, and any other use of the essential characteristics of the invention with equivalent means falls within the scope of the present patent.

Thus, for example, the substitution of prisms for the mirrors in the same function, or the replacement of the single converging lens by another refracting or reflecting member, or else the use of the variable geometric convergence feature in connection with the observing of images other than stereoscopic couples, all form part of the invention described in the present patent.

Finally, it should be noted that the viewer in accordance with the present patent provides an advantageous solution to the examination of stereoscopic image couples which it makes possible without it being necessary to first switch said images, a process known under the name of transposition.

I claim:

1. In a binocular optical viewing system for the visual observing of a pair of spaced images including optical devices defining a pair of light paths from the eyes to the images having parallel portions, including a pair of mirrors disposed in each said light path, each mirror pair having right-angularly related mirrors, with one said mirror being part transparent and part reflective and disposed at an angle of 45° to a said light path on the eye side thereof thereby to direct parallel light rays therefrom toward the eyes, said other mirror of each pair being on the image side of said path, the improvement comprising, refractive optical member means disposed in said light paths and at 45° to said mirrors, said refractive means being mounted for movement in a direction parallel to its plane and perpendicular to said light path thereat, whereby movement of said refractive means with respect to said mirrors shifts said parallel light path portions on the eye side of said mirrors to increase or decrease the distance therebetween.

2. The system of claim 1 wherein said refractive means include a lens.

3. The system of claim 1 wherein said refractive means includes a pair of lenses, with one of said lenses disposed in each of said parallel path portions on the eye side of said mirrors.

4. The system of claim 1 wherein said pair of light paths include coincident portions located between said mirror pairs on the image side thereof.

5. The system of claim 4 wherein said refractive means includes a lens disposed along said coincident path portions.

6. The system of claim 5 wherein said lens is received in a channel for rolling motion therein.

* * * * *